Oct. 28, 1969   J. L. WALTON III   3,474,542
WHEEL GAUGE DETECTOR SYSTEM
Filed May 20, 1966   3 Sheets-Sheet 2
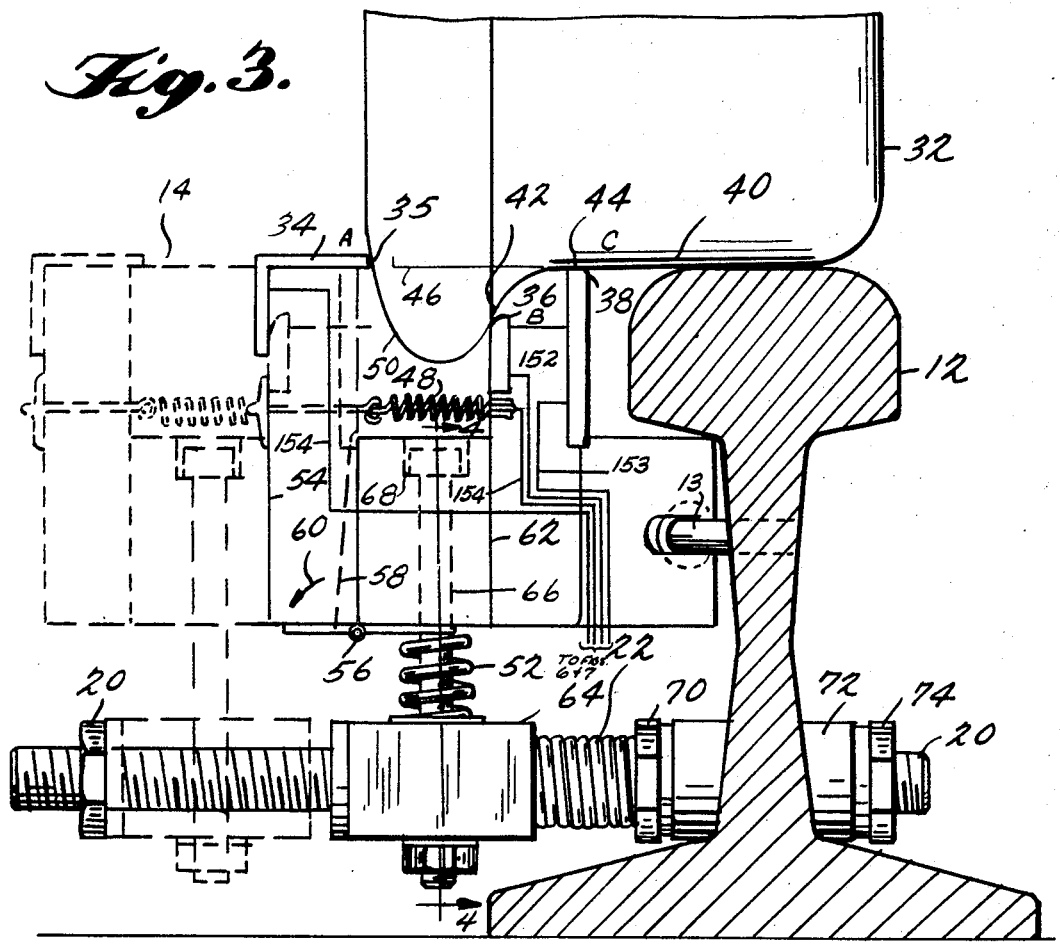
Fig. 3.
Fig. 4.
INVENTOR.
JOSEPH L. WALTON III
BY
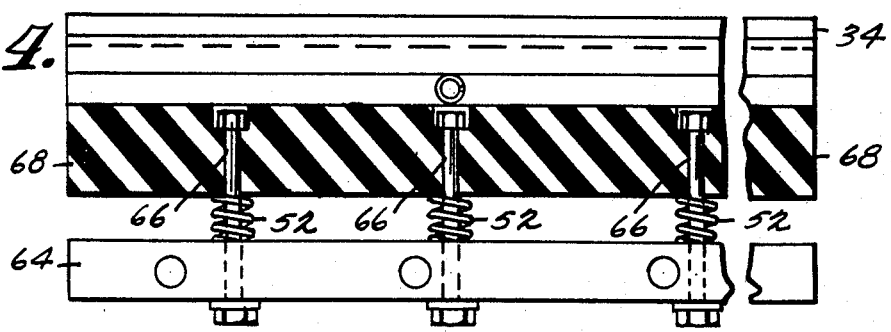
ATTORNEYS Oct. 28, 1969          J. L. WALTON III          3,474,542
WHEEL GAUGE DETECTOR SYSTEM
Filed May 20, 1966                    3 Sheets-Sheet 3
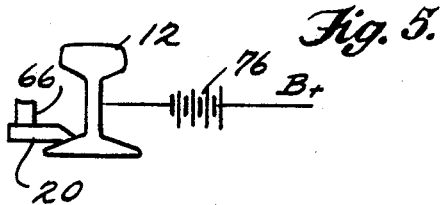
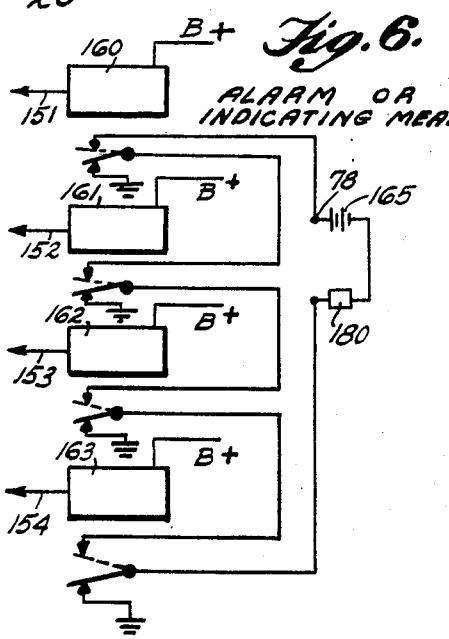
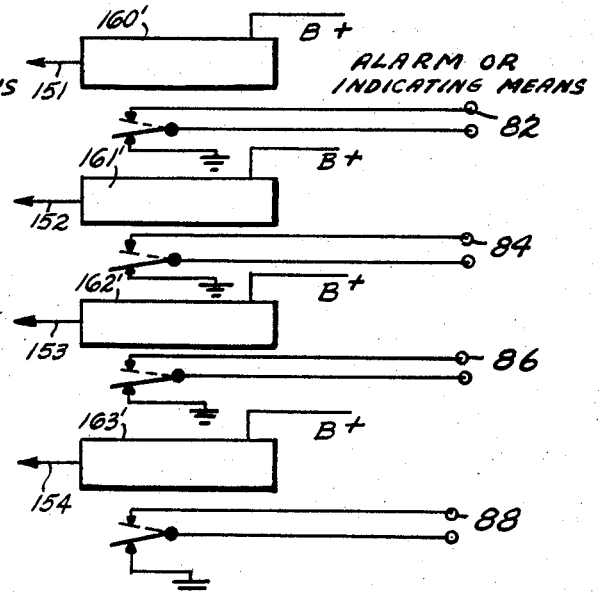
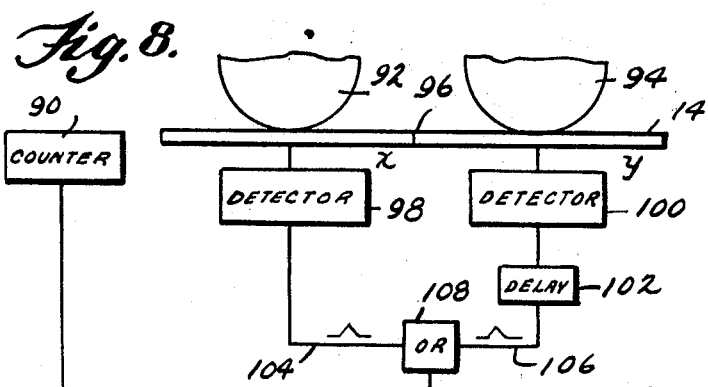
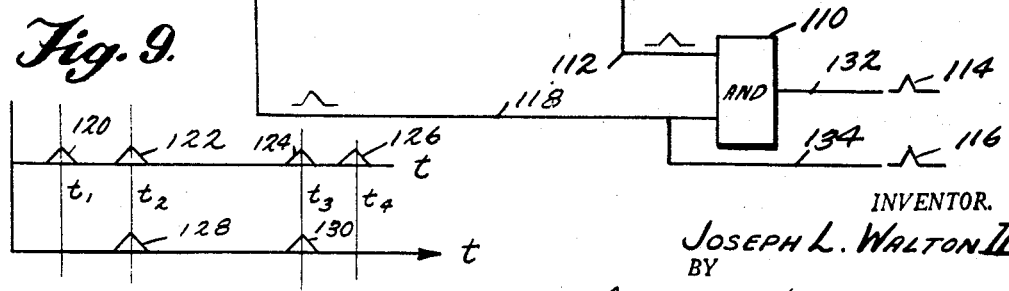
INVENTOR.
JOSEPH L. WALTON III
BY
Cushman, Darby & Cushman
ATTORNEYS United States Patent Office 3,474,542
Patented Oct. 28, 1969

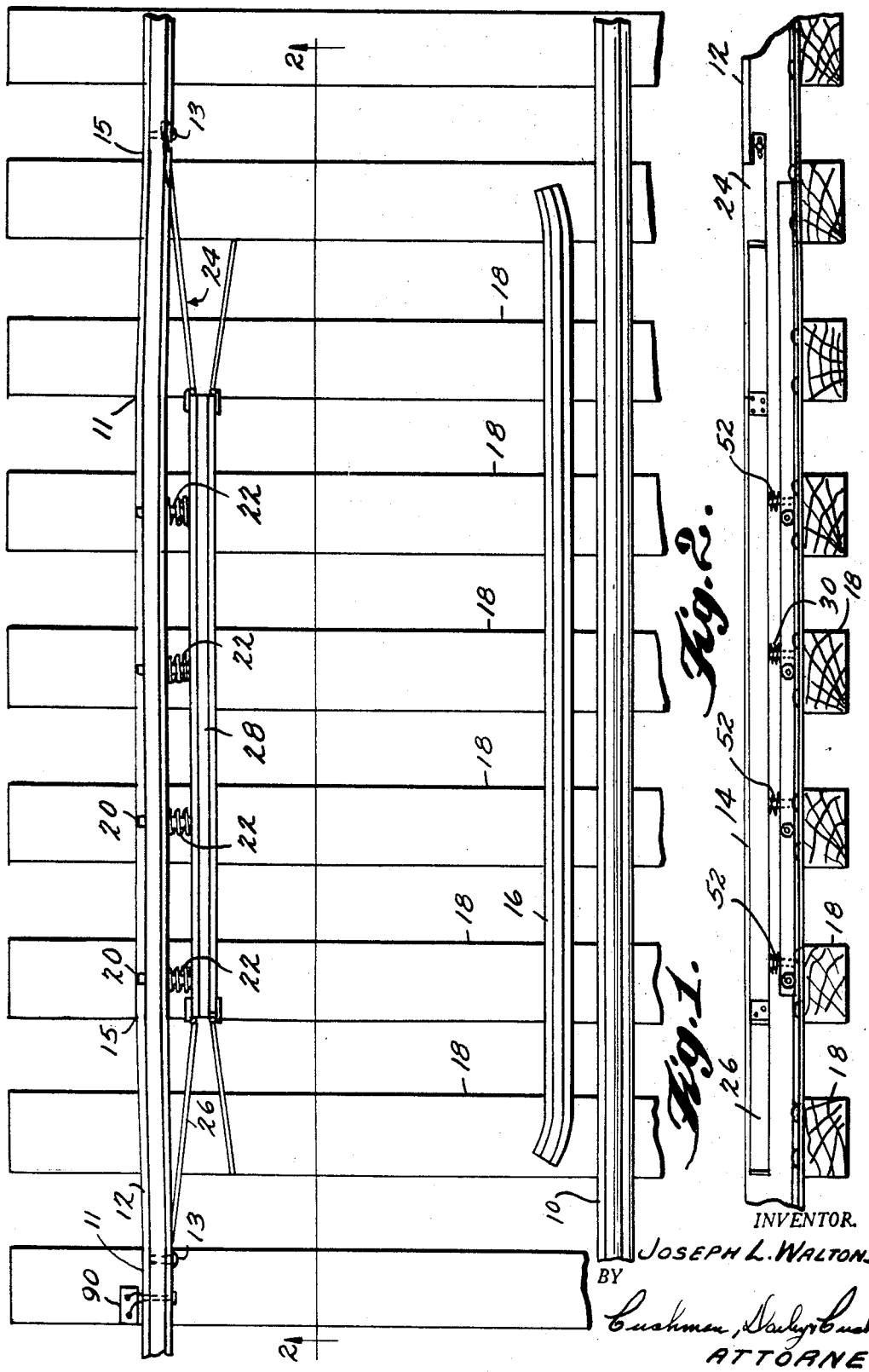

3,474,542
WHEEL GAUGE DETECTOR SYSTEM
Joseph L. Walton III, 361 Mount Pleasant Drive,
Woodbridge, Va. 22191
Filed May 20, 1966, Ser. No. 551,565
Int. Cl. B61k 9/12
U.S. Cl. 33—203.11       23 Claims

ABSTRACT OF THE DISCLOSURE

This specification discloses apparatus for automatically sensing and indicating a defective condition in a railroad wheel as the car upon which the wheel is mounted passes a sensing point. A sensing element comprising three conductive contact members is provided to accept the flange of the wheel to be tested. The contacts are so arranged as to define the minimum acceptable contour of the flange of the wheel. Should any portion of the flange or tread be less than the minimum acceptable dimension, contact between the wheel and the sensing contact at that point will be broken. A source of electrical energy is coupled through the rail, the wheel to be tested, the sensing contacts and a plurality of relays. Indicating or alarm means are coupled to the contacts of the relays such that when contact is not made between the respective sensing elements and the wheel, the corresponding relay will be deenergized and the alarm or indicating devices will notify an operator that the wheel being tested is defective.

---

This invention relates to an apparatus for sensing and indicating the defective condition of railroad wheels automatically and instantaneously. It particularly relates to a system for detecting and determining which wheels of a train are defective, while the train is moving.

It has for its principal object the provision of a simple, accurate and efficient device which gives an automatic signal indication of the status of railroad wheels of a moving train. The system particularly detects the specific flange contour of the railroad wheel and makes a determination of whether or not it meets the safety regulations promulgated by the Association of American Railroads, and it further identifies which wheel among a plurality of wheels of the train is defective.

It is well known that railroad safety systems have been devised previous to this. However, this particular system is the first to ascertain a defective identification of a railroad wheel by determining whether or not the flange contour being detected meets certain predetermined required minimum standards established by the Association of American Railroads.

The system which comprises this particular invention detects the flange contour of a railroad wheel at three specific points, namely, the back face of the rim, the throat of the flange, and the initial portion of the tread. The three points are sensed by sensing elements which are attached on a railroad track and which can therefore measure these particular points of the railroad wheel while the train is in motion.

It has been the practice in the measuring apparatus prior to this invention to gauge only one point of the railroad wheel, that is, to determine the length of the flange or the wear of the tread. In the subject system the railroad wheels are measured at the rim, the flange, and the tread simultaneously to thereby determine whether the flange contour can and does meet the predetermined requirements.

The Association of American Railroads has recommended that certain minimum flange contour standards be followed for the safety requirements of freight service and for passenger service. These requirements must be followed by the railroads who participate in the interchange program.

Ideally for safety purposes railroad wheels should be replaced whenever they are found to be defective. However, many railroads, due to economic reasons, do not attempt to replace their defective railroad wheels with new wheels when it is possible to refurbish them and still maintain the minimum predetermined standards. The Association has established certain dimensions and regulations which are the minimum requirements for the safety of passengers and freight. When a wheel is determined to be defective it can be machined to reestablish its dimension as required by the railroads. These minimum dimensions for example are: the flange contour must be a $\frac{5}{8}''$ radial contour from a central foci; the tread must be maintained at $\frac{7}{8}''$ or more from the base line for freight service; the minimum tread requirement for passenger cars is $1\frac{1}{8}''$ or more from the base line. This invention allows the railroads to determine when the wheels on their cars have surpassed these minimum requirements so that any defects may be mitigated. The dimensions are merely listed for exemplary purposes and are not to be considered limitative in any way. Any other minimum dimensions could also be used.

The main object of the invention is, therefore, to provide a novel and improved system for sensing, detecting and identifying defective wheels on a railroad train, such as the uneven or minimum contours of the flanges which may arise from the wear and tear on the railroad wheels. The improved detection means is simple in construction, reliable in operation, and provides unmistakable signals indicating the passage of a defective wheel over the system.

A further object of the invention is to provide an improved signal system for detecting broken wheel flanges, flat wheels, or other wheel defects, providing also a recorded or visual signal to indicate the presence of a defective wheel as it passes over the detecting apparatus of the system, and also to provide an impulse adapted control device which makes the identification of the defective wheel easily determinable.

Further objects and advantages of the invention become apparent from the following description and claims and from the accompanying drawings, wherein:

FIGURE 1 is a top plan view of a pair of railway tracks equipped with an improved defective wheel detection apparatus according to the present invention;

FIGURE 2 is a longitudinal vertical cross section of FIGURE 1, taken from line 2–2';

FIGURE 3 is a vertical cross sectional view of the sensing and detecting apparatus as it is connected to a railroad track showing the railroad wheel being enclosed therewith;

FIGURE 4 is a longitudinal view of the connected apparatus to the railroad track, taken from line 4–4';

FIGURES 5, 6 and 7 are schematic wiring diagrams illustrating the electrical connections of the apparatus shown in FIGURES 1 through 4 indicating the means which are used to determine the defective wheel;

FIGURE 8 is a block diagram of the complete wheel identification system;

FIGURE 9 is a graph indicating the timing and identifying pulses for the system of FIGURE 8.

Referring particularly to the drawings wherein like numerals delineate similar elements in all the figures, in FIGURE 1, 10 and 12 respectively designate a pair of railway tracks over which a railway vehicle is adapted to pass, the track rail 12 is provided with the electrical detecting means generally designated as 14, which is adapted to respond to passage thereover of the wheels of the vehicle in a manner presently to be described. Track 12 is offset, as can be seen at points 11 and 15, this is provided to assure that detecting means 14 will be in a continuous straight line with the non-offset rail portion when it is in an operating condition. The rail 10 is provided with an auxiliary guard rail 16 to prevent the vehicle passing on railway tracks 10 and 12 from laterally swaying while it is passing over the section of the tracks provided with the defective wheel detection apparatus 14. The guard rail 16 is secured to the railway ties 18 in any suitable manner and is spaced inwardly from the track rail 10 by a sufficient distance to receive the flanges of the wheels supported on track 10 and to cooperate with said flanges to hold the vehicle against lateral movement as it passes over the portion of the track 10 and 12 provided with electrical detecting apparatus 14.

The electrical detecting apparatus 14 is further provided with lateral supporting means which connect it to track 12. These supporting means are shown as 20. They comprise laterally disposed bolts including therewith springs 22 which are more specifically described in relation to the operation of the detecting apparatus as shown in FIGURE 3. The electrical detecting apparatus 14 is also provided with leading rail means 24 and trailing rail means 26 which assure that the wheel being detected and the flange thereof enter into the detecting groove 28. These leading-in and trailing connections 24 and 26 can be connected to the track 12 in any desired form which is resilient to the movement of the railroad wheel thereon. They are shown connected to the rail 12 by bolt means 13, but any other connecting means can be suitably used.

Referring specifically to FIGURE 2, track 12 is shown with the electrical detecting apparatus 14 connected thereto. This electrical detecting apparatus 14 is provided with vertical springs 52 which allow the detecting apparatus 14 to be firmly placed in contact with the three specific points to be detected. This type of a spring bias arrangement not only maintains the electrical detecting apparatus 14 against the three measuring points which were previously mentioned but also assures that the detecting apparatus sways with the movement of the train wheel so that no force will be impinging upon it to thereby ruin or abort the detection and measuring operation.

Reference is now made to FIGURE 3 wherein a railroad wheel 32 is undergoing the test and detection analysis according to the dictates of the present invention. As previously described, three particular points are detected; by analyzing these three specific points the flange contour of wheel 32 can be determined. Sensing contact 34 is laterally placed so that a contact is made with the back face of the rim at point 35 of railroad wheel 32. Sensing contact 36 is located in such a manner so that the throat of the flange of railroad wheel 32 is detected at point 42. Sensing contact 38 is placed in such a manner that the initial tapering point 44 of the tread 40 of railroad wheel 32 is detected. The three sensing contacts 34, 36, and 38 are set at the preestablished contour magnitudes which are the minimum flange contour requirements made by the Association. The specific disposition of sensing contacts 34, 36 and 38 determines the flange contour of any railroad wheel which passes through the electrical detecting apparatus 14.

The American Association of Railroads has established a $\frac{5}{8}''$ radius for a normally acceptable flange contour, and it is generally measured from point 35 to point 42, i.e. between contacts 34 and 36. The throat of the flange begins from point 42 and continues to point 44, and it must have an $\frac{11}{16}''$ radius from a gauging point which is established from the baseline 46. These dimensions are used merely for exemplary purposes.

Spring 48, shown disposed below the flange 50, is also conveniently made a sensing contact by using a conductive spring means. This spring can then be used to determine the depth or the height of the flange 50 whenever the flange 50 comes into contact therewith. If contact is made between spring means 48 and flange 50, it is a further indication that the railroad wheel 32 is worn beyond the minimum standard requirements. However, this is not the primary purpose of the invention as previously noted, this is a derivative function thereof. The three points which are of primary interest in the detection system are the detectors as they are disposed at the points delineated by numerals 35, 42 and 44. These points determine the flange contour of the railroad wheel 32. They are predisposed in such a manner that if no contact is made by the railroad wheel at any one of the three points 35, 42 and 44 by sensing elements 34, 36 and 38, then that wheel is defective according to the preestablished standards.

Spring 52 further assures that these three contact points are maintained at their predetermined distance from the wheel. It also assures that good contact can be maintained by the electrical detection means 14 against the railroad wheel 32. The sensing contacts 34, 36 and 38 are conductors in this instance, but can be of any material which transmits an electrical signal when the required contact condition is not being met. Another function which make this invention a distinct improvement over the prior art is spring 48, which not only acts as a detector for flange depth or length, but also biases the non-conductor support 54 for sensing contact 34 so that it assures the contact at the back face of the rim point 35 of wheel 32. This support is pivoted at point 56 and is beveled at 58. The pivoting point 56 allows any rocks, dirt or grease which may be attached to railroad wheel 32 to pass through the electrical detecting means 14 without harming it or ruining the detecting qualities. The beveling of the non-conductive support 54, as shown at 58, allows for the elimination of any foreign matter which may be in contact with wheel 32 to fall through the detector apparatus 14 so that no harm arises from it. This pivotal point moves as shown by the direction of arrow 60. The sensing contacts 36 and 38 are supported by a vertical support means 62 which is also composed of non-conductive dielectric material so that the two readings being made by transducers or sensors 36 and 38 do not interfere with each other.

The dotted line representation of electrical detection apparatus 14 is shown to facilitate the comprehension of the subject invention. It shows the detection apparatus 14 when it is at rest in its steady state condition without any railroad wheel 32 being detected and analyzed. The apparatus in the steady state condition as shown by the dotted line configuration is supported in such a manner that it can be brought into the detecting operation by sidewise pressure on the lead in rail 24 (FIGURE 1) from the railroad wheel which passes on the track section where the electrical detector means 14 is located. The spring bias 22 will assure that the electrical detecting means 14 is quickly returned to its steady state position whenever the detecting operation is completed. This is accomplished by using a bolt 20 which is of sufficient length to accommodate the steady state position of electrical detecting means 14 during its inoperative condition. The electrical detecting apparatus 14 is supported through retangular sleeve support means 64, it is slidably attached to bolt 20 and it presses against the spring 22 during the detecting operation. The electrical detecting apparatus 14 is further supported through a rod 66 which is connected to means 64 and, as it can be seen from FIGURE 3, a spring bias mechanism 52 is attached to rod 66. Rod 66 is in turn connected to a supporting portion of the detection apparatus 14 delineated generally as 68. This can be of any type of non-conductive material and it must be insulated from the respective sensing contacts 34, 36 and 38. The bolt 20 is connected to the rail 12 through a lock nut arrangement composed of nuts 70 and 74 and sleeve 72. This type of arrangement is shown merely for convenience, any other attachment which will connect the detection apparatus 14 to the railroad track 12 can be conveniently used.

The sensing contacts 34, 36 and 38, and spring 48 have connected thereto, output leads 151, 152, 153 and 154, respectively, which leads are in turn connected to the indicating circuits shown in FIGURES 6 and 7.

FIGURE 4 shows the specific connection of the detection apparatus 14 to its supporting sleeve 64 taken from the line 4–4' of FIGURE 3. It can be seen that support rod 66 is countersunk into the non-conductive material 68 so that when spring 48 acts as a measuring means for the depth or height of the flange 50, no interference by the connecting rod 66 will be made.

FIGURE 5a discloses the power arrangement which is used by the system. It is composed of a D.C. power source 76, the negative pole of which is connected to the railroad track 12. The support means for the detection apparatus 14 are indicated by the horizontal bolt 20 and vertical support 66. The other pole of power source 76 is connected to the electrical determining circuits presently to be described. FIGURE 6 specifically displays a relay type circuit which is used in a series arrangement and which renders an indication that a wheel passing through the electrical detecting apparatus 14 is defective at all four points thereby effectively determining whether or not a passing railroad wheel is defective. The electrical determining apparatus comprises relays 160–163, each of which is coupled between the positive pole of source 76 (FIGURE 5) and respective ones of the sensing contacts 34–38 by leads 151–154. In this manner, when the wheel 32 is in contact with sensing contacts 34–36, relays 160, 161 and 162 will be energized through the circuits comprising the rail 12, the wheel 32, sensing contacts 34–36 and leads 151–153. The relay 163 will not be energized so long as the wheel 32 does does not contact spring 48.

The contacts of the relays 151–153 are shown in their energized position, i.e., when the wheel is of the proper dimensions. The contacts of relay 163 are shown in their de-energized state, i.e., when the wheel flange is not in contact with the spring 48. The contacts of the relays 160–163 are connected in series between the terminals 78 which are in turn connected across the source 165 and alarm means 180.

When the railroad wheel 32 fails to make contact with sensing contacts 34, 36 and 38 at points 35, 42 and 44, respectively, because of a defect in the railroad wheel 32, the circuit to relays 160, 161 and 162 is broken and the relays will be de-energized, thereby causing the relay contacts to assume the dotted line position shown in FIGURE 6. If flange 50 is longer than the predetermined height or if the thread is broken, the flange will make contact with spring element 48 to thus complete the circuit to relay 163 and energize the same. This reverses the de-energized condition of relay 163 and completes the series circuit composed of the relay contacts of relays 160–163. Upon completion of this circuit an alarm or indicating means 180 which is connected through source 165 to terminals 78 is activated. This alarm or indicating means is generally located at a central control point, whereby a determination can be made to check the railroad wheel, thereby eliminating any hazards which may be encountered through a defective railroad wheel. The system denoted by FIGURE 6 is shown in a series configuration, which means that the three-flange contour points 35, 42 and 44 must be defective simultaneously and that the height of the flange 50 is over the minimum requirement. The defect which arises, due either to a defective flange contour or to a flange which is too high, breaks the electrical circuit, de-energizes the normally energized relays 160, 161 and 162. However, a contact must also be made upon spring 48, and relay 163, being in a normal de-energized condition, becomes energized, thereby completing the series arrangement and issuing a signal at output 78.

FIGURE 7 displays a parallel type of relay arrangement wherein a particular defect of a railroad wheel can be sensed and detected from a central control area. Relays 160', 161' and 162' are normally energized in their steady state condition. Relay 163', in its normal steady state, is de-energized. The relays 160'–163' are coupled to the source 76 and the respective sensing contacts in the same manner as relays 160–163 shown in FIGURE 6. The full line position of the contacts of relays 160'–162' is achieved when these relays are energized, i.e., when sensing contacts 34 to 38 are in contact with the wheel. The dotted line position indicates the de-energized position of these contacts. The terminals 82, 84 and 86 to which the respective pairs of contacts are connected are further coupled to an indicating means and a source of potential (not shown) in the same manner as terminal 78, as shown in FIGURE 6. The full line position of the contacts of relay 163' is the de-energized position thereof. The dotted line illustrates the energized position. Terminals 88 are also coupled to a suitable indicating means and a source of potential (not shown). The parallel arrangement shown in FIGURE 6 allows for individual determination to be made of the four particular points being detected.

If a defect at one of the particular points is sensed an output is derived from each individual defect at outputs 82, 84, 86 and 88. These outputs can be located at a central control area and by connecting a suitable alarm or indicating means to each output a determination can be made of the particular defect of the railroad wheel which has been sensed by the electrical detecting apparatus 14.

The sensing contacts 34 and 36 are so arranged that the distance therebetween is equal to the minimum permissible flange width. Thus, should the flange be worn to a width less than this separation, no contact will be made between sensing contact 34 and the wheel 32. In this situation, relay 160' will be de-energized and the alarm circuit coupled to terminal 82 will indicate a defective condition. The sensing contacts 36 and 38 are so arranged such that when contact 36 is at point 42, on the wheel 32, the contact 38 will contact the tread of the wheel at point 44 only if the tread is not worn beyond the minimum permissible dimension. Thus, with a defective tread, no contact will be made between the wheel and contact 38 and the alarm circuit coupled to terminals 86 will indicate a defective wheel. Should the flange 50 of the wheel be broken, no contact will be made between point 42 and sensing contact 36 whereby the alarm circuit coupled to terminals 84 will indicate a defective wheel. Should the tread be broken or the flange be too large, contact will be made between the flange and spring 48 to thereby energize relay 163' and cause the alarm circuit coupled to terminals 88 to indicate a defective wheel.

The series circuit shown in FIGURE 6 is analogous to an "AND" circuit which indicates an alarm only when all of the points being sensed are defective.

FIGURE 8 displays a system which can be used to identify which particular railroad wheel among a plurality of them has been sensed to be defective. Wheels 92 and 94 are two wheels which compose a truck arrangement of a railroad cab. Detecting apparatus 14 is divided into two sections x and y by a dielectric non-conductive element at 96. These two sections x and y are divided in such a manner that the length of the two sections is as long as one half of the circumference of wheels 92 and 94. The leading section x and lagging section y together sense the complete wheel as it moves over the complete electrical detecting apparatus 14. Detectors 98 and 100 are constructed in the same manner as shown by relay systems of FIGURES 6 and/or 7. The selection of either a parallel or series relay arrangement is determined by the railroad company, depending on whether or not each defect is desired to be sensed or all four defects are to be sensed and determined. These detectors generate a signal according to the particular type of defect which is sensed by detecting apparatus 14. A delay means 102 is inserted in signal response section *y* of detecting apparatus 14 for reasons to be explained infra.

The two signals on lines 104 and 106 are simultaneously entered in an OR gate type of logic arrangement, shown as 108. The output from the OR gate is fed into an AND gate 110 via line 112. The output 132 from AND gate 110, in conjunction with the output from counter 90 on line 134, determines and identifies the particular wheel which is defective. This output, shown as pulses 114 and 116, is recorded by any type of a suitable recorder (not shown) which is located at the central control point. From the data so received, an identification is then made of the particular wheel which is defective. The operation of this system is now described in conjunction with the timing graph shown by FIGURE 9.

Assuming that wheels 92 and 94 are two wheels on the cab of a train which are being detected. Wheel 92 first passes over section *y* of detecting apparatus 14. If it is defective in any of the four particular points which were described previously, a signal is generated by the detector 100. This signal is delayed by delay means 102 for a time period long enough to allow the other half of the wheel 92 to be detected for any defects which it may have. This latter detection is made by section *x* of electrical detecting apparatus 14. If this latter half, however, is also defective, a signal emanates from detector 98 via line 104 to OR gate 108. The logic OR 108 emits a signal at 112 whenever line 104 or 106 has a signal thereon. The OR gate 108 then generates a signal on line 112. The wheel 92 at this point has been completely detected and travels by a counter which generates a signal wheel count every time a railroad wheel has been detected. This counting signal will be conveyed to the AND gate 110 via line 118. The logic AND gate will emit an output on line 132 only when both of its input lines 112 and 118 have been energized.

From the graph of FIGURE 9, a wheel which is defective can be identified. Pulses 120, 122, 124 and 126 represent the pulses which are emitted from the counter 90 each time it is activated by a passing wheel. Pulses 128 and 130 represent output pulses of the AND gate 110 on line 132. Assuming that only four wheels of a railroad train are detected and counted by counter 90, from the graph shown at FIGURE 9, a determination can be made that the first and the third wheel counted are defective in some manner. This determination, as can be readily ascertained, is shown by one of the four defects which have been sensed and detected by the electrical detecting apparatus 14. Further sophisticated circuitry, which for matters of convenience is not shown here, could be added to the system as displayed in FIGURE 8, so that a determination could be made not only for one of the particular wheels which is defective, but also which of the particular defects is making that wheel defective. A second delay means may be included in lead 104 to compensate for the time required for the wheel to pass from the detector X to the counter 90 when the counter is displaced from the detector X.

The system has been described with particular reference in determining defects of railroad wheels on one side of a train, however, it is obvious that defects can be detected by using this invention on both sides of a multiple car train. To perform this operation a detector of the type described is applied to both sides of the track upon which the train is moving. The necessary circuitry can be added to further delineate and correlate the outputs of the multiple detection, thereby allowing further identification of a particular defective wheel.

Thus, it is apparent that there has been described a railroad wheel detecting apparatus which provides for a detection of the defects of a railroad wheel at specific and particular points.

The invention has been described in a specific embodiment merely for convenience. It must be understood that the invention has many varied embodiments aside from the specific description.

Other objects and advantages and even further modifications and embodiments of the invention will become apparent to those of ordinary skill in the art upon reading this disclosure. However, it is understood that this disclosure is intended to be illustrative and not limitative, the invention being described by the appended claims.

I claim:

1. A system for detecting a defective railroad wheel comprising:

reference means biasingly urged against said wheel in the flange throat area thereof as said wheel passes by for establishing a gauging reference point for said wheel, means having a predetermined physical relationship to said reference means for sensing the flange contour of said passing railroad wheel based on said reference point, and means for determining defects in said flange contour of said passing railroad wheel, connected to said means for sensing said flange contour, whereby any flange contour not meeting predetermined requirements is sensed.

2. A system for detecting a defective railroad wheel comprising:

means for sensing the flange contour of said railroad wheel, and means for determining defects in said flange contour of said railroad wheel, connected to said means for sensing said flange contour, whereby any flange contour not meeting predetermined requirements is sensed, wherein said means for sensing the flange contour comprises:

first means for sensing the back face of the rim of said railroad wheel, second means for sensing the throat of said flange contour, third means for sensing the tread of said railroad wheel, and said first, second, and third sensing means being connected to said means for determining defects in said flange contour, whereby defective railroad wheels are detected.

3. A system as in claim 1 including means for identifying which railroad wheel is defective among a plurality of railroad wheels, said means for identifying being connected to said means for determining defects in said contour of said railroad wheel.

4. A system as in claim 1 wherein said means for sensing the flange contour includes sensing means for sensing the height of said flange.

5. A system as in claim 1 including means for maintaining said railroad wheel within the sensing means.

6. A system as in claim 1 including means connected to said sensing means for maintaining said sensing means against said railroad wheel.

7. A system as in claim 2 wherein said means for determining defects of said railroad wheel comprises a plurality of switching means connected to said first, second, and third sensing means.

8. A system as in claim 2 wherein said first, second, and third sensing means are specifically located at the rim, throat and tread of said railroad wheel establishing thereby a specific flange contour.

9. A system for detecting defective railroad wheels comprising:

two track rails disposed in a parallel relationship, means connected to one of said track rails for sensing the flange contour of said railroad wheels including reference means for establishing a gauging reference point in the flange area of each passing wheel, means for determining defects in said flange contour of said railroad wheels, connected to said means for sensing said flange contour, means for maintaining said railroad wheels within said sensing means, disposed on the opposite track rail to that upon which said sensing means are connected, and means connected to said sensing means for maintaining said reference means against said railroad wheels at the throat area thereof, so that the sensing and determining functions are accurately performed relative to the respective reference points.

10. A system for detecting defective railroad wheels comprising:

two track rails disposed in a parallel relationship, means conncted to one of said track rails for sensing the flange contour of said railroad wheels, means for determining defects in said flange contour of said railroad wheels, connected to said means for sensing said flange contour, means for maintaining said railroad wheels within said sensing means, disposed on the opposite track rail to that upon which said sensing means are connected, and means connected to said sensing means for maintaining said sensing means against said railroad wheels, so that the sensing and determining functions are accurately performed, and said sensing means connected to one of said track rails comprises:

first means for sensing the back face of the rim of said railroad wheel, second means for sensing the throat of said flange contour, third means for sensing the tread of said railroad wheels, and said first, second, and third sensing means being connected to said means for determining defects in said flange contour, whereby defective railroad wheels are detected.

11. A system as in claim 9 including means for identifying which railroad wheel is defective among a plurality of railroad wheels, and said means for identifying is connected to said means for determining defects in said flange contour.

12. A system as in claim 9 including a direct voltage power source connected to one of said track rails.

13. A system as in claim 11 wherein said means for identifying which railroad wheel is defective comprises:

counting means located on said same track whereupon said means for determining defects is located, and a plurality of switching means connected to said means for determining defects and to said counting means whereby a signal is derived identifying the railroad wheel which is defective.

14. A system as in claim 13 wherein said counting means is activated after said railroad wheels are sensed.

15. A system as in claim 10 wherein said first means for sensing the back face of the rim is vertically aligned in respect to the rim of said railroad wheel, said second means for sensing the throat of said flange contour is horizontally aligned in respect to said first sensing means, and said third means for sensing the tread of said railroad wheel is vertically aligned in respect to said tread.

16. A system as in claim 10 wherein said first, second, and third sensing means are specifically disposed at the rim, throat and tread of said railroad wheel establishing thereby a specific flange contour.

17. A system as in claim 10 including fourth means for sensing the height of the flange of said railroad wheel.

18. A system as in claim 10 wherein said means for determining defects in said flange contour comprises a plurality of switching means connected to said first, second, and third sensing means.

19. A system as in claim 18 wherein said plurality of switching means are plural relays which are de-energized when a defect is sensed.

20. A system as in claim 1 wherein said sensing means includes an electrical element horizontally and vertically spaced predetermined amounts from said reference means for sensing the tread of said passing wheel relative to said reference point.

21. A system as in claim 1 wherein said sensing element includes an electrical element biasingly urged toward the said reference means for sensing the back face of the rim of said passing wheel.

22. A system as in claim 21 wherein said sensing system includes a second electrical element disposed between and vertically from said reference means and first mentioned electrical element for sensing the outer periphery of said flange relative to said reference point and the point of contact on said back face by said first electrical element.

23. A system as in claim 22 wherein said sensing means includes a third electrical element horizontally and vertically spaced from said reference means by predetermined amounts for sensing the tread of said passing wheel relative to said reference point.

References Cited

UNITED STATES PATENTS

| | | | |
|---|---|---|---|
| 1,389,748 | 9/1921 | Fisher | 246—255 |
| 2,277,099 | 3/1942 | Harshman | 246—169 |
| 2,452,480 | 10/1948 | Mason | 246—169 |
| 2,831,965 | 4/1958 | Walker | 246—169 |
| 3,188,464 | 6/1965 | Gieskieng | 246—169 |
| 3,253,140 | 5/1966 | Sibley et al. | 246—169 |

ARTHUR L. LA POINT, Primary Examiner

U.S. Cl. X.R.

246—169